Jan. 29, 1924.
J. H. WILLIAMSON
1,482,174
CLINKER, COAL, AND CINDER TONGS
Filed April 12, 1921
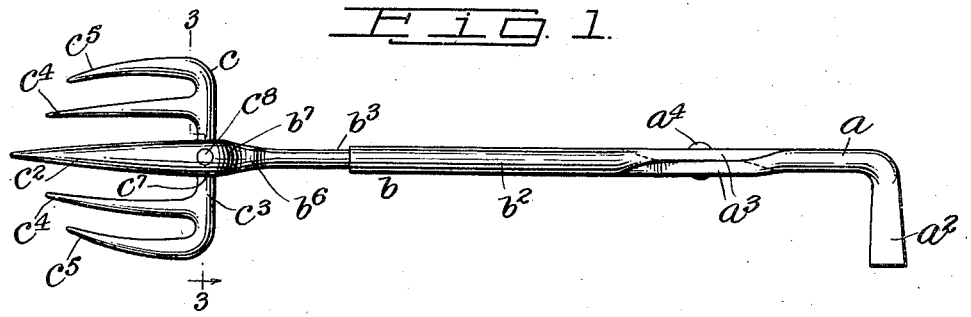
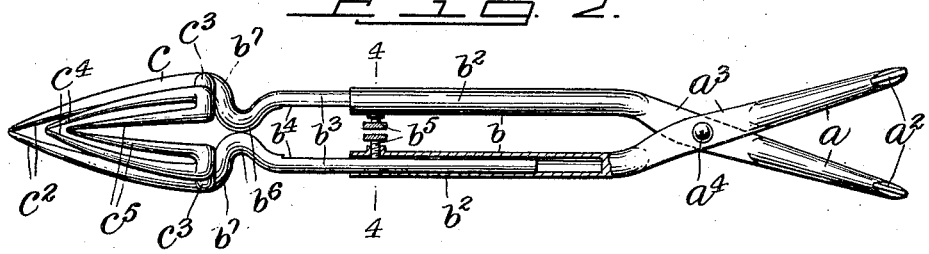
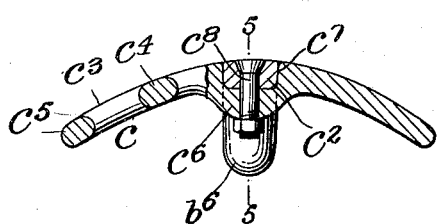
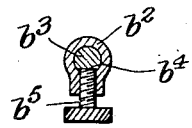
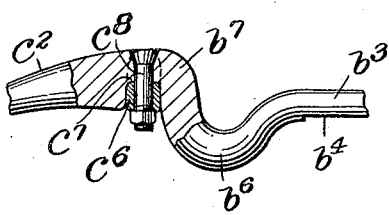
Inventor
James H. Williamson
By his Attorney's Patented Jan. 29, 1924.

1,482,174

UNITED STATES PATENT OFFICE.

JAMES H. WILLIAMSON, OF NEW YORK, N. Y.

CLINKER, COAL, AND CINDER TONGS.

Application filed April 12, 1921. Serial No. 460,736.

*To all whom it may concern:*

Be it known that I, JAMES H. WILLIAMSON, a citizen of the United States, and residing at New York, in the county of Bronx and State of New York, have invented certain new and useful Improvements in Clinker, Coal, and Cinder Tongs, of which the following is a specification, such as will enable those skilled in the art to which it appertains to make and use the same.

This invention relates to clamp tongs for use in removing clinkers, charcoal, and cinders from the fire-boxes or ash-pits of furnaces and heaters of any kind or class; and the object thereof is to provide an improved device or devices of this class by means of which clinkers, coals, cinders, etc., may be quickly and easily broken up or loosened up and removed from furnaces or the fire-boxes thereof and from the fire-boxes or ash-pits of heaters of any kind such as household stoves, heaters, burners, or the like, used for cooking, heating or other purposes; and with this and other objects in view the invention consists of a device or devices of the class specified. constructed and operated as hereinafter described and claimed.

The invention is fully disclosed in the following specification, of which the accompanying drawing forms a part, in which the separate parts of my improvement are designated by suitable reference characters in each of the views, and in which:

Fig. 1 is a plan view of my improved tongs;

Fig. 2 a view at right angles to that of Fig. 1 and showing parts of the construction in section;

Fig. 3 a section on the line 3—3 of Fig. 1;

Fig. 4 a section on the line 4—4 of Fig. 2; and

Fig. 5 a section on the line 5—5 of Fig. 3.

My improved tongs, as shown in the drawing, comprise main handle members $a$ having supplemental handle members $a^2$ at right angles to the main handle members, and the main handle members $a$ are provided with flattened shank portions $a^3$ through which is passed a pivot or similar device $a^4$ in the manner of other devices of this class.

The shank members $a^3$ are provided with telescopic arms $b$ consisting, in the form of construction shown, of main tubular members $b^2$ and supplemental arm or bar members $b^3$ which are inserted into and adapted to be longitudinally adjustable in the tubular members $b^2$.

The supplemental arm members $b^3$ are flattened on the inner sides thereof, as shown at $b^4$, and set screws $b^5$ are passed outwardly through the inner sides of the parts $b^2$ and bear on the flattened surfacees $b^4$ of the parts $b^3$, and by means of this construction the parts $b^3$ are prevented from rotating in the parts $b^2$ and said parts $b^3$ may be adjusted longitudinally of and in the parts $b^2$ so as to shorten or lengthen the tongs or the arm members thereof to any desired extent.

The supplemental arm members $b^3$ are provided, in the construction shown, with inwardly directed and loop shaped shank members $b^6$ having outwardly directed portions $b^7$ with which are connected, or to which are secured, the jaw members $c$ of my improved tongs, and in the construction shown the parts $b^6$ are extended to form the central finger $c^2$ of the jaw members $c$.

The jaw members $c$ consist of a cross head portion $c^3$ provided with inner side fingers $c^4$ and outer side fingers $c^5$ and the central fingers $c^2$, in the construction shown, are longer than the other fingers, and the inner side fingers $c^4$ are longer than the outer side fingers $c^5$.

The central part of the cross head portion $c^3$ of the jaw members $c$ is thickened as shown at $c^6$ in Fig. 3 and the backs of the thickened portions are provided with recesses $c^7$ into which the inner head portions of the fingers $c^2$ are set, as shown in Fig. 3, and these parts are secured together by bolts $c^8$, but it must be understood that my invention is not limited to the method of constructing the jaw members $c$ or the means for or method of connecting said jaw members with the supplemental arm members $b^3$ herein shown and described, the main object in this connection being to make the jaw members substantially of the form herein shown and described so as to render them operative as hereinafter described.

In the use of my improved tongs the length of the arm members $b$ may be adjusted so as to accommodate the use of said tongs in furnaces of different lengths or dimensions, said arms being extended when it is desired to clean long fire boxes or furnace pits and shortened in the operation of cleaning shorter fire boxes or fire pits and removing clinkers, coal and cinders therefrom. The object of providing the main handle members $a$ with the supplemental handle members $a^2$ at an angle thereto or depending therefrom is to provide means whereby the device may be operated by grasping the supplemental handle members $a^2$ instead of the main handle members $a$, which operation would remove the hands of the operator further from the heat, and also enable him to expose less hand surface to the heat than would be necessary when the tongs are operated by means of the main handle members $a$.

From the foregoing description it will also be seen that the jaw members $c$ of my improved tongs, form claw shaped devices similar in form to a partially closed human hand, and the middle fingers $c^2$ should be longer and stronger than the side fingers, and all of said fingers are slightly curved inwardly, as will be seen, and the parts $b^6$ form heels or wrists at the base of the jaws $c$ or the fingers thereof which, with the shape of the jaws and the fingers thereof, gives said parts the appearance of two half-closed hands being brought together to form a scoop or container, as indicated in Fig. 2.

Although I have shown and described the middle finger $c^2$ of the jaw members as being formed integral with the parts $b^3$, $b^6$ and $b^7$ this is not, of course, essential and said fingers may be formed integral with the jaw members $c$ if desired.

One of the objects of forming the fingers of the jaw members $c$ of different lengths as herein shown and described is to enable the operator to easily reach into the corners or angles of a furnace or fire box or of a grate stove or other heater, and thus be able to remove all small or large cinders, coals or clinkers therefrom, and the object of placing the screws $b^5$ on the inner sides of the arm members $b^2$ is to prevent said screws from coming in contact with furnace walls or fire box walls as will be readily understood.

While I have shown and described the preferred means for carrying my invention into effect, the said invention is not limited to the details of construction herein shown and described and changes therein and modifications thereof may be made within the scope of the appended claims without departing from the spirit of my invention or sacrificing its advantages.

Having fully described my invention, that which I claim as new and desire to secure by Letters Patent, is as follows:

1. A pair of tongs of the class described comprising handle members pivotally connected and provided with arm extensions provided with similar claw shaped jaws having fingers which increase in length from the opposite sides thereof inwardly the lengths of the arm members or extensions being longitudinally adjustable.

2. A pair of tongs of the class described comprising main handle members having angular extensions, said handle members being provided with projecting telescopic arm members the lengths of which are adjustable and one set of said arm members being provided with similar clamping jaws having curved fingers which increase in length from the opposite sides thereof inwardly.

3. A pair of tongs of the class described comprising pivotally connected handle members provided at one end with projecting claws joined to said handle members by substantially hook-shaped neck portions, other claw members detachably mounted in connection with the claws of said handle members and interlocked therewith.

4. A pair of tongs of the class described comprising pivotally connected handle members provided at one end with projecting claws joined to said handle members by substantially hook-shaped neck portions, other claw members detachably mounted in connection with the claws of said handle members and interlocked therewith, said claw members comprising a plurality of fingers located at the opposite sides of the claws of said handle members and being of different lengths.

5. A pair of tongs of the class described comprising pivotally connected handle members provided at one end with projecting claws joined to said handle members by substantially hook-shaped neck portions, other claw members detachably mounted in connection with the claws of said handle members and interlocked therewith, said claw members comprising a plurality of fingers located at the opposite sides of the claws of said handle members and being of different lengths, and said handle members being composed of adjustably connected parts.

In testimony that I claim the foregoing as my invention I have signed my name in presence of the subscribing witnesses this 9th day of April, 1921.

JAMES H. WILLIAMSON.

Witnesses:
C. D. LINZEL,
H. E. THOMPSON.